United States Patent
Soejima et al.

(10) Patent No.: US 8,524,361 B2
(45) Date of Patent: Sep. 3, 2013

(54) HEAT-PEELABLE PRESSURE-SENSITIVE ADHESIVE SHEET FOR CUTTING LAMINATED CERAMIC SHEET AND METHOD FOR CUT-PROCESSING LAMINATED CERAMIC SHEET

(75) Inventors: Kazuki Soejima, Ibaraki (JP);
Takamasa Hirayama, Ibaraki (JP);
Daisuke Shimokawa, Ibaraki (JP);
Masaaki Sato, Ibaraki (JP); Yukio Arimitsu, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 237 days.

(21) Appl. No.: 12/716,306

(22) Filed: Mar. 3, 2010

(65) Prior Publication Data
US 2010/0224316 A1  Sep. 9, 2010

(30) Foreign Application Priority Data
Mar. 4, 2009 (JP) .................................. 2009-050032

(51) Int. Cl.
*B32B 7/12* (2006.01)
*B32B 15/04* (2006.01)

(52) U.S. Cl.
USPC ....... 428/343; 428/40.1; 428/346; 428/355 R; 428/411.1

(58) Field of Classification Search
USPC .................. 428/40.1, 343, 346, 355 R, 411.1
See application file for complete search history.

(56) References Cited

U.S. PATENT DOCUMENTS
2008/0038540 A1  2/2008  Hirayama et al.
2011/0200744 A1  8/2011  Hirayama et al.

FOREIGN PATENT DOCUMENTS
| CN | 101126001 A | 2/2008 |
| JP | 50-13878 | 4/1975 |
| JP | 51-24534 B | 7/1976 |
| JP | 56-61468 A | 5/1981 |
| JP | 56-61469 A | 5/1981 |
| JP | 60-252681 A | 12/1985 |
| JP | 2004091563 | * 3/2004 |
| JP | 2005146151 | * 6/2005 |

OTHER PUBLICATIONS

Communication dated Feb. 27, 2013 from the State Intellectual Property Office of P.R. China in a counterpart application No. 201010122640.1.

* cited by examiner

*Primary Examiner* — Linda L Gray
(74) *Attorney, Agent, or Firm* — Sughrue Mion, PLLC

(57) ABSTRACT

The invention relates to a heat-peelable pressure-sensitive adhesive sheet for cutting a laminated ceramic sheet, which is used for temporary fixing at cutting of the laminated ceramic sheet, the heat-peelable pressure-sensitive adhesive sheet including a base material and, formed on at least one surface of the base material, a heat-expandable pressure-sensitive adhesive layer containing a pressure-sensitive adhesive and a foaming agent, in which the heat-expandable pressure-sensitive adhesive layer has a gel fraction of 50% by weight or more, and the heat-expandable pressure-sensitive adhesive layer has a glass transition temperature of −40° C. to 30° C.

15 Claims, 1 Drawing Sheet

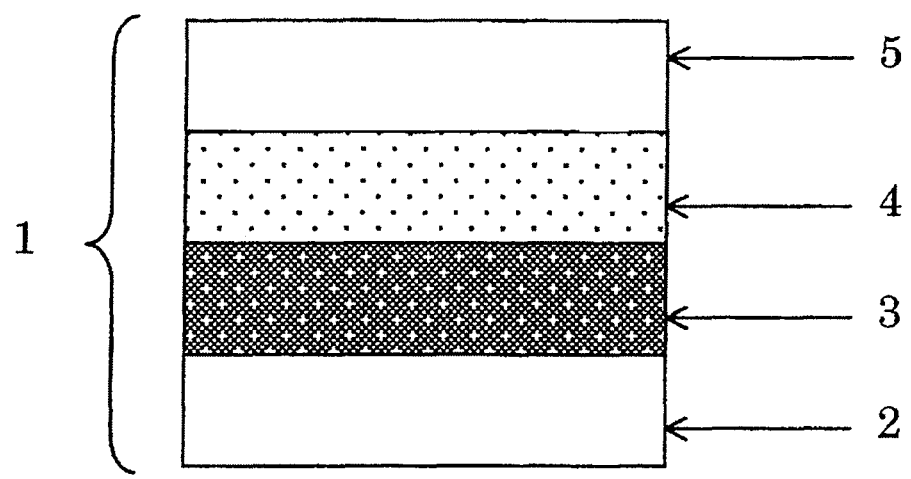

HEAT-PEELABLE PRESSURE-SENSITIVE ADHESIVE SHEET FOR CUTTING LAMINATED CERAMIC SHEET AND METHOD FOR CUT-PROCESSING LAMINATED CERAMIC SHEET

FIELD OF THE INVENTION

The present invention relates to a heat-peelable pressure-sensitive adhesive sheet for cutting a laminated ceramic sheet and a method for cut-processing a laminated ceramic sheet using the heat-peelable pressure-sensitive adhesive sheet.

BACKGROUND OF THE INVENTION

Recent demands on electronic parts are miniaturization and precise formation of the parts themselves. For example, in ceramic condensers, miniaturization and high capacity formation by high lamination of layers whose number significantly exceeds several hundreds or more have become prominent, which is represented by so-called "0603" or so-called "0402". Particularly, in the lamination field of a pre-baking sheet (green sheet) of ceramics such as ceramic condensers, accuracy at processing is increasingly required for miniaturization and precise formation.

For example, as one example of the process for producing ceramic condensers, there is mentioned a production process which includes (1) a step of printing electrodes on the green sheet, (2) a lamination step, (3) a pressurization step (a press step under pressurization), (4) a cutting step, and (5) a baking step, in which the lamination step (2) and the pressurization step (3) are repeated predetermined times and then the cutting step (4) follows.

As accuracy required in such steps, for example, accuracy in electrode printing may be mentioned in the step (1) of printing electrodes on the green sheet, accuracy in an electrode position may be mentioned in the lamination step (2), accuracy in prevention of electrode position shift which may be caused by deformation of the green sheet through pressurization to shift the electrode position may be mentioned in the pressurization step (3), and accuracy through cutting may be mentioned in the cutting step (4). When accuracy decreases in any one step among these steps, a product becomes worse and productivity decreases. Among them, with regards to the step (1) of printing electrodes on the green sheet, the lamination step (2), and the cutting step (4), since mechanical accuracy is required, it is possible to cope therewith through improvement of an apparatus and increase in accuracy.

Of these steps, particularly in the cutting step (4), a method of utilizing a heat-peelable pressure-sensitive adhesive sheet has been widely popularized. By utilizing the heat-peelable pressure-sensitive adhesive sheet, since firm fixing can be achieved during the cutting step (4) and pressure-sensitive adhesive force is lowered by heating after the cutting step (4), a cut ceramic condenser can be easily peeled from the heat-peelable pressure-sensitive adhesive sheet (see, e.g., Patent Documents 1 to 5).

Patent Document 1: JP-UM-B-50-13878
Patent Document 2: JP-B-51-24534
Patent Document 3: JP-A-56-61468
Patent Document 4: JP-A-56-61469
Patent Document 5: JP-A-60-252681

SUMMARY OF THE INVENTION

Recently, however, at cut-processing, particularly at push-cutting cut-processing, for the purpose of improving cutting accuracy, the green sheet is cut after the sheet is softened under a high-temperature atmosphere. Under such a high-temperature atmosphere, since pressure-sensitive adhesive force tends to decrease to a large extent as compared with the pressure-sensitive adhesive force at room temperature, there is a problem of decrease in process yield owing to so-called "chip fly" and the like, which is attributable to insufficient pressure-sensitive adhesive force at cutting in the case of conventional heat-peelable pressure-sensitive adhesive sheets. Moreover, in the case where the sheet is designed so as to have a high pressure-sensitive adhesiveness in order to prevent the chip fly, there arises a problem that chip-peelability after heating becomes worse. Thus, satisfaction of both of chip fly suppression at processing and heat-peelability after processing becomes a problem to be solved.

The invention is performed in view of the above problems. An object of the invention is to provide a heat-peelable pressure-sensitive adhesive sheet for cutting a laminated ceramic sheet, which is capable of exhibiting a sufficient pressure-sensitive adhesiveness at cut-processing not only at room temperature but also under a high-temperature atmosphere and is also capable of easily peeling the sheet by heating at peeling, as well as a method for cut-processing a laminated ceramic sheet using the heat-peelable pressure-sensitive adhesive sheet.

As a result of extensive studies for solving the above conventional problems, the present inventors have found that, when the gel fraction of the base polymer of the pressure-sensitive adhesive forming the heat-peelable pressure-sensitive adhesive layer in the heat-peelable pressure-sensitive adhesive sheet is adjusted to a specific value and the glass transition temperature (Tg) of the heat-peelable pressure-sensitive adhesive layer is adjusted to a specific value, respectively, a sufficient pressure-sensitive adhesiveness can be exhibited at cut-processing not only at room temperature but also under a high-temperature atmosphere and also easy peeling can be achieved by heating at peeling. Thus, the invention can be accomplished.

Namely, the invention relates to a heat-peelable pressure-sensitive adhesive sheet for cutting a laminated ceramic sheet, which is used for temporary fixing at cutting of the laminated ceramic sheet, the heat-peelable pressure-sensitive adhesive sheet including a base material and, formed on at least one surface of the base material, a heat-expandable pressure-sensitive adhesive layer containing a pressure-sensitive adhesive and a foaming agent, in which the heat-expandable pressure-sensitive adhesive layer has a gel fraction of 50% by weight or more, and the heat-expandable pressure-sensitive adhesive layer has a glass transition temperature of $-40°$ C. to $30°$ C.

As above, since the heat-peelable pressure-sensitive adhesive sheet for cutting a laminated ceramic sheet according to the invention has constitutions or characteristics of the following (1) and (2), both of the pressure-sensitive adhesiveness and the heat-peelability are satisfied in a good balance and thus a good pressure-sensitive adhesiveness can be exhibited even under a high-temperature atmosphere at push-cutting cut-processing of the laminated ceramic sheet to effectively hold processed cut pieces (chips), so that it is possible to effectively suppress or prevent chip fly during processing. Moreover, at peeling after the cut-processing, easy peeling can be achieved while exhibiting an excellent heat-peelability and thus it is possible to effectively suppress or prevent fouling of the adherend.

(1) A gel fraction of the heat-expandable pressure-sensitive adhesive layer is 50% by weight or more.

(2) A glass transition temperature (Tg) of the heat-expandable pressure-sensitive adhesive layer is −40° C. to 30° C.

In the present invention, the base polymer of the pressure-sensitive adhesive forming the heat-expandable pressure-sensitive adhesive layer is preferably an acrylic polymer. In addition, it is preferable that the pressure-sensitive adhesive forming the heat-expandable pressure-sensitive adhesive layer further contains a crosslinking agent.

In the present invention, it is preferable that the heat-expandable pressure-sensitive adhesive layer has an adhesive force at 23° C. (peeling angle: 180°, drawing rate: 300 mm/min) of 2 N/20 mm width to 20 N/20 mm width when the heat-expandable pressure-sensitive adhesive layer is allowed to stand under an atmosphere of 23° C. for 30 minutes after attached to a polyethylene terephthalate film (thickness: 25 μm) at 23° C., and that the heat-expandable pressure-sensitive adhesive layer has an adhesive force at 80° C. (peeling angle: 180°, drawing rate: 300 mm/min) of 1 N/20 mm width to 15 N/20 mm width when the heat-expandable pressure-sensitive adhesive layer is allowed to stand under an atmosphere of 80° C. for 30 minutes after attached to a polyethylene terephthalate film (thickness: 25 μm) at 23° C.

The invention also provides a method for cut-processing a laminated ceramic sheet, which includes steps of attaching a laminated ceramic sheet to the above-mentioned heat-peelable pressure-sensitive adhesive sheet, and subjecting the laminated ceramic sheet to a cut-processing treatment.

The heat-peelable pressure-sensitive adhesive sheet for cutting a laminated ceramic sheet according to the invention can exhibit a sufficient pressure-sensitive adhesiveness at cut-processing not only at room temperature but also under a high-temperature atmosphere and also can be easily peeled by heating at the peeling. Therefore, when the heat-peelable pressure-sensitive adhesive sheet for cutting a laminated ceramic sheet according to the invention is used, chip detachment can be suppressed or prevented to thereby suppress or prevent decrease in process yield at cut-processing of the laminated ceramic sheet, as well as fouling of an adherend surface can be suppressed or prevented to effect easy peeling by heating after the cut-processing, so that it becomes possible to produce a chip-form cut ceramic condenser in an excellent productivity.

BRIEF DESCRIPTION OF THE DRAWINGS

FIG. 1 is a cross-sectional schematic view showing one embodiment of a heat-peelable pressure-sensitive adhesive sheet according to the invention.

DESCRIPTION OF REFERENCE NUMERALS AND SIGNS 1 heat-peelable pressure-sensitive adhesive sheet
2 base material
3 rubbery organic elastic layer
4 heat-expandable pressure-sensitive adhesive layer
5 separator

DETAILED DESCRIPTION OF THE INVENTION

An embodiment of the present invention is described with reference to FIG. 1, but the invention is not limited to this embodiment. FIG. 1 is a cross-sectional schematic view showing one embodiment of the heat-peelable pressure-sensitive adhesive sheet of the invention. In FIG. 1, 1 is a heat-peelable pressure-sensitive adhesive sheet, 2 is a base material, 3 is a rubbery organic elastic layer, 4 is a heat-expandable pressure-sensitive adhesive layer, and 5 is a separator. However, parts that are unnecessary for the description are not given, and there are parts shown by magnifying, minifying, etc. in order to make the description easy.

The heat-peelable pressure-sensitive adhesive sheet 1 shown in FIG. 1 is constituted by the base material 2, the rubbery organic elastic layer 3 formed on one surface of the base material 2, the heat-expandable pressure-sensitive adhesive layer 4 formed on the rubbery organic elastic layer 3, and further the separator 5 formed on the heat-expandable pressure-sensitive adhesive layer 4. In this connection, as shown in FIG. 1, in the heat-peelable pressure-sensitive adhesive sheet of the invention, the rubbery organic elastic layer may be optionally provided. Moreover, in the heat-peelable pressure-sensitive adhesive sheet of the invention, the heat-expandable pressure-sensitive adhesive layer may be provided on one surface of the base material or may be provided on each surface of the base material. In this connection, in the heat-peelable pressure-sensitive adhesive sheet, in the case where the heat-expandable pressure-sensitive adhesive layer is provided only on one surface of the base material, a usual pressure-sensitive adhesive layer having no heat-expandability (non-heat-expandable pressure-sensitive adhesive layer) may be provided on the other surface of the base material.

Base Material

The base material (supporting base material) can be used as a supporting material for the heat-expandable pressure-sensitive adhesive layer and the like. As the base material, for example, suitable thin bodies, e.g., paper-based base materials such as paper; fiber-based base materials such as fabrics, non-woven fabrics, felts, and nets; metal-based base materials such as metal foils and metal plates; plastic base materials such as plastic films and sheets; rubber-based base materials such as rubber sheets; foamed bodies such as foamed sheets; and laminates thereof [particularly, laminates of plastic based materials with other base materials, laminates of plastic films (or sheets) each other, etc.] can be used. As the base material, one which does not melt at the heating treatment temperature of the heat-expandable pressure-sensitive adhesive layer and is excellent in heat resistance is preferable in view of handling properties and the like after heating. In the invention, as the base material, plastic base materials such as plastic films and sheets can be suitably employed. Examples of raw materials for such plastic base materials include olefinic resins such as polyethylene (PE), polypropylene (PP), and ethylene-propylene copolymers; copolymers using ethylene as a monomer component, such as ethylene-vinyl acetate copolymers (EVA), ionomer resins, ethylene-(meth)acrylic acid copolymers, and ethylene-(meth)acrylic acid ester (random, alternating) copolymers; polyesters such as polyethylene terephthalate (PET), polyethylene naphthalate (PEN), and polybutylene terephthalate (PBT); acrylic resins; polyvinyl chloride (PVC); polyurethanes; polycarbonates; polyphenylene sulfide (PPS); amide-based resins such as polyamides (Nylon) and whole aromatic polyamides (aramide); polyether ether ketones (PEEK); polyimides; polyetherimides; polyvinylidene chloride; ABS (acrylonitrile-butadiene-styrene copolymers); cellulose-based resins; silicone resins; and fluorinated resins. Moreover, as the material of the base material, a polymer such as a cross-linked body of each of the above resins can also be used. These raw materials can be used alone or two or more types can be used in combination.

In the case where a plastic base material is used as the base material, deformation properties such as an elongation degree may be controlled by a stretching treatment or the like.

The thickness of the base material is not particularly limited and can be appropriately selected depending on strength, flexibility, intended purpose of use, and the like. For example, the thickness is generally 1000 µM or less (e.g., 1 µm to 1000 µm), preferably 1 µm to 500 µm, further preferably 3 µm to 300 µm, and particularly about 5 µm to 250 µm but is not limited thereto. In this connection, the base material may have any form of a single layer or a laminated layer.

A commonly used surface treatment, e.g., a chemical or physical treatment such as a chromate treatment, ozone exposure, flame exposure, exposure to high-voltage electric shock, and an ionized radiation treatment, and a coating treatment with an undercoating agent can be applied in order to improve adhesiveness with the adjacent layer, holding properties, etc.

Incidentally, the base material may contain various additives (colorants, fillers, plasticizers, antiaging agents, antioxidants, surfactants, flame retardants, etc.) within the range where the advantages and the like of the invention are not impaired.

Heat-Expandable Pressure-Sensitive Adhesive Layer

The heat-expandable pressure-sensitive adhesive layer contains at least a pressure-sensitive adhesive for imparting pressure-sensitive adhesiveness and a foaming agent for imparting heat-expandability. In the invention, it is important that the heat-expandable pressure-sensitive adhesive layer has constitutions or characteristics of the following (1) and (2). Thus, by adjusting the gel fraction of the heat-expandable pressure-sensitive adhesive layer and the glass transition temperature of the heat-expandable pressure-sensitive adhesive layer, the pressure-sensitive adhesiveness and heat-peelability of the heat-expandable pressure-sensitive adhesive layer can be controlled.

(1) The gel fraction of the heat-expandable pressure-sensitive adhesive layer is 50% by weight or more.

(2) The glass transition temperature (Tg) of the heat-expandable pressure-sensitive adhesive layer is −40° C. to 30° C.

(Gel Fraction)

The gel fraction of the heat-expandable pressure-sensitive adhesive layer is 50% by weight or more, preferably 60% by weight or more, and further preferably 80% by weight or more. When the gel fraction of the heat-expandable pressure-sensitive adhesive layer is 50% by weight or more, easy peeling can be achieved by heating at the peeling from the adherend. Namely, when the gel fraction of the heat-expandable pressure-sensitive adhesive layer is 50% by weight or more, the adherend does not remain on the heat-expandable pressure-sensitive adhesive layer and peeling by heating alone (spontaneous peeling) can be effectively performed at the peeling by heating. Specifically, when the gel fraction of the heat-expandable pressure-sensitive adhesive layer is 50% by weight or more, cut-processed chips can be peeled only by reversing the heat-peelable pressure-sensitive adhesive sheet so that the sheet is turned upside down in the air (so that the cut-processed chips on the heat-expandable pressure-sensitive adhesive layer are put down) after the heat-expandable pressure-sensitive adhesive layer is subjected to a heating treatment. Furthermore, fouling of the surface of the adherend (or cut-processed chips) can be also suppressed or prevented.

In the invention, the gel fraction of the heat-expandable pressure-sensitive adhesive layer can be measured by the following measurement method.

<Measurement Method of Gel Fraction>

About 0.1 g of a sample is sampled from a heat-expandable pressure-sensitive adhesive layer (not subjected to a heating treatment for heat expansion) and precisely weighed (Weight of Sample) and, after the sample is wrapped in a mesh-type sheet, is immersed in about 50 ml of toluene at room temperature for 1 week. Thereafter, a solvent-insoluble matter (content in the mesh-type sheet) is taken out of the toluene and dried at 130° C. for about 2 hours, a solvent-insoluble matter after drying is weighed (Weight after Immersion and Drying), and then the gel fraction (% by weight) is calculated according to the following equation (a).

Gel Fraction (% by weight)=[(Weight after Immersion and Drying)/(Weight of Sample)]×100  (a)

Incidentally, the gel fraction of the heat-expandable pressure-sensitive adhesive layer can be controlled by regulating the composition of the base polymer of the pressure-sensitive adhesive for forming the heat-expandable pressure-sensitive adhesive layer, the kind and content of the crosslinking agent to be added to the pressure-sensitive adhesive, the kind and content of the tackifier, and the like.

(Glass Transition Temperature)

In the invention, as mentioned above, the glass transition temperature (Tg) of the heat-expandable pressure-sensitive adhesive layer is −40° C. to 30° C., preferably −30° C. to 25° C., further preferably −20° C. to 20° C., and particularly preferably −15° C. to 15° C. When the glass transition temperature of the heat-expandable pressure-sensitive adhesive layer is −40° C. to 30° C., the layer exhibits a high pressure-sensitive adhesiveness to the adherend even at high temperature and chip fly at the cut-processing of the laminated ceramic sheet can be effectively suppressed or prevented, as well as initial tackiness to the adherend is good, attaching workability to the adherend is high, and the adherend can be effectively held. Moreover, when the heat-peelable pressure-sensitive adhesive sheet is peeled by heating, the adherend does not remain on the heat-peelable pressure-sensitive adhesive sheet and peeling by heating alone (spontaneous peeling) can be effectively performed.

In the invention, the glass transition temperature (Tg) of the heat-expandable pressure-sensitive adhesive layer can be measured by the following measurement method.

<Measurement Method of Glass Transition Temperature>

A plurality of the heat-peelable pressure-sensitive adhesive sheets are attached to each other (the heat-expandable pressure-sensitive adhesive layer of one heat-peelable pressure-sensitive adhesive sheet is attached to the base material of another heat-peelable pressure-sensitive adhesive sheet) to prepare a sheet whose total thickness of the heat-expandable pressure-sensitive adhesive layers is 2 mm, which is then punched out into a disk by means of a punch having a diameter of 7.9 mm, thereby a sample being prepared. The sample (disk-shaped sample having a diameter of 7.9 mm and a thickness of 2 mm) is sandwiched between a pair of stainless steel parallel plates having a diameter of 8 mm (manufactured by TA Instruments; Model 708.0157), viscoelasticity is measured in the temperature range of −70° C. to 150° C. at a temperature-elevating rate of 5° C./minute and in a shear mode while shear strain was imparted at a chuck pressure of 100 g-weight and at a frequency of 1 Hz using a dynamic viscoelasticity spectrometer (manufactured by Rheometrics Scientific Company; product name "ARES"), and temperature at a maximum value of loss tangent (tan δ) is determined, the temperature at a maximum value of loss tangent being regarded as the glass transition temperature (Tg).

Incidentally, the glass transition temperature (Tg) of the heat-expandable pressure-sensitive adhesive layer can be controlled by the kind of the base polymer of the pressure-sensitive adhesive for forming the heat-expandable pressure-sensitive adhesive layer or the kind of the monomer component(s) for preparing the base polymer, the kind and content of each component (tackifier, foaming agent) contained in the heat-expandable pressure-sensitive adhesive layer, and the like.

(Pressure-Sensitive Adhesive)

As the pressure-sensitive adhesive for forming the heat-expandable pressure-sensitive adhesive layer, it is important to use a pressure-sensitive adhesive which results in prescribed values of the gel fraction and the glass transition temperature when the heat-expandable pressure-sensitive adhesive layer is formed therefrom. Additionally, a pressure-sensitive adhesive which does not restrain foaming and/or expansion of the foaming agent (a heat-expandable microsphere, etc.) as far as possible at heating can be suitably used. Specifically, as the pressure-sensitive adhesive, a pressure-sensitive adhesive having the above-mentioned characteristics can be suitably used with selection among known pressure-sensitive adhesives such as acrylic pressure-sensitive adhesives, rubber-based pressure-sensitive adhesives, vinyl alkyl ether-based pressure-sensitive adhesives, silicone-based pressure-sensitive adhesives, polyester-based pressure-sensitive adhesives, polyamide-based pressure-sensitive adhesives, urethane-based pressure-sensitive adhesives, fluorine-based pressure-sensitive adhesives, styrene-diene block copolymer-based pressure-sensitive adhesives, and creeping property-improving pressure-sensitive adhesives in which a heat-meltable resin having a melting point of about 200° C. or lower is mixed into these pressure-sensitive adhesives (see, e.g., JP-A-56-61468, JP-A-61-174857, JP-A-63-17981, JP-A-56-13040, etc.). Moreover, as the pressure-sensitive adhesives, radiation-curable pressure-sensitive adhesives (or energy ray-curable pressure-sensitive adhesives) can be also used. The pressure-sensitive adhesives can be used alone or two or more types can be used in combination. Incidentally, in the case where the pressure-sensitive adhesive is constituted by two or more pressure-sensitive adhesives, it is important that the pressure-sensitive adhesive constituted by two or more types of pressure-sensitive adhesives has the above-mentioned characteristics.

In the invention, as the pressure-sensitive adhesive, acrylic pressure-sensitive adhesives and rubber-based pressure-sensitive adhesives can be suitably used and particularly, acrylic pressure-sensitive adhesives are suitable. As the acrylic pressure-sensitive adhesives, there may be mentioned acrylic pressure-sensitive adhesives in which an acrylic polymer (homopolymer or copolymer) using one or more alkyl (meth)acrylates ((meth)acrylic acid alkyl esters) as monomer components is used as the base polymer.

Examples of the alkyl (meth)acrylates in the above-mentioned acrylic pressure-sensitive adhesives include alkyl (meth)acrylates such as methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, pentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, and eicosyl (meth)acrylate, and the like. As the alkyl (meth)acrylates, alkyl (meth)acrylates having 4 to 18 carbon atoms are suitable. Incidentally, the alkyl group of the alkyl (meth)acrylate may be linear or branched.

The above-mentioned acrylic polymer may contain units corresponding to other monomer components polymerizable with the above-mentioned alkyl (meth)acrylate (copolymerizable monomer component) for the purpose of modifying cohesive force, heat resistance, crosslinking ability, and the like. Examples of such copolymerizable monomer components include carboxyl group-containing monomers such as (meth)acrylic acid (acrylic acid or methacrylic acid), carboxyethyl acrylate, carboxypentyl acrylate, itaconic acid, maleic acid, fumaric acid, and crotonic acid; acid anhydride group-containing monomers such as maleic anhydride and itaconic anhydride; hydroxyl group-containing monomers such as hydroxyethyl (meth)acrylate, hydroxypropyl (meth)acrylate, hydroxybutyl (meth)acrylate, hydroxyhexyl (meth)acrylate, hydroxyoctyl (meth)acrylate, hydroxydecyl (meth)acrylate, hydroxylauryl (meth)acrylate, and (4-hydroxymethylcyclohexyl)methyl methacrylate; sulfonic acid group-containing monomers such as styrenesulfonic acid, allylsulfonic acid, 2-(meth)acrylamide-2-methylpropanesulfonic acid, (meth)acrylamidepropanesulfonic acid, sulfopropyl (meth)acrylate, and (meth)acryloyloxynaphthalenesulfonic acid; phosphoric acid group-containing monomers such as 2-hydroxyethylacryloyl phosphate; (N-substituted)amide-based monomers such as (meth)acrylamide, N,N-dimethyl(meth)acrylamide, N-butyl(meth)acrylamide, N-methylol(meth)acrylamide, and N-methylolpropane (meth)acrylamide; aminoalkyl (meth)acrylate-based monomers such as aminoethyl (meth)acrylate, N,N-dimethylaminoethyl (meth)acrylate, and t-butylaminoethyl (meth)acrylate; alkoxyalkyl (meth)acrylate based monomers such as methoxyethyl (meth)acrylate and ethoxyethyl (meth)acrylate; cyanoacrylate monomers such as acrylonitrile and methacrylonitrile; epoxy group-containing acrylic monomers such as glycidyl (meth)acrylate; styrene-based monomers such as styrene and α-methylstyrene; vinyl ester-based monomers such as vinyl acetate and vinyl propionate; olefin-based monomers such as isoprene, butadiene, and isobutylene; vinyl ether-based monomers such as vinyl ether; nitrogen-containing monomers such as N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic acid amides, and N-vinylcaprolactam; maleimide-based monomers such as N-cyclohexylmaleimide, N-isopropylmaleimide, N-laurylmaleimide, and N-phenylmaleimide; itaconimide-based monomers such as N-methylitaconimide, N-ethylitaconimide, N-butylitaconimide, N-octylitaconimide, N-2-ethylhexylitaconimide, N-cyclohexylitaconimide, and N-laurylitaconimide; succinimide-based monomers such as N-(meth)acryloyloxymethylenesuccinimide, N-(meth)acryloyl-6-oxyhexamethylenesuccinimide, and N-(meth)acryloyl-8-oxyoctamethylenesuccinimide; glycol-based acrylic ester monomers such as polyethylene glycol (meth)acrylate, polypropylene glycol (meth)acrylate, methoxyethylene glycol (meth)acrylate, and methoxypolypropylene glycol (meth)acrylate; acrylic acid ester-based monomers having a heterocycle, a halogen atom, a silicon atom, or the like, such as tetrahydrofurfuryl (meth)acrylate, fluorine (meth)acrylate, and silicone (meth)acrylate; polyfunctional monomers such as hexanediol di(meth)acrylate, (poly)ethylene glycol di(meth)acrylate, (poly)propylene glycol di(meth)acrylate, neopentyl glycol di(meth)acrylate, pentaerythritol di(meth)acrylate, trimethylolpropane tri(meth)acrylate, pentaerythritol tri(meth)acrylate, dipentaerythritol hexa(meth)acrylate, epoxy acrylate, polyester acrylate, urethane acrylate, divinylbenzene, butyl di(meth)acrylate, and hexyl di(meth)acrylate;

and the like. These copolymerizable monomer components can be used alone or two or more types can be used in combination.

(Foaming Agent)

The foaming agent used in the heat-expandable pressure-sensitive adhesive layer is not particularly limited and a heat-expandable microsphere can be suitably used. The foaming agent can be used alone or two or more types can be used in combination. The heat-expandable microsphere can be appropriately selected from known heat-expandable microspheres. As the heat-expandable microsphere, a microcapsulated foaming agent can be suitably used. Examples of such a heat-expandable microsphere include microspheres in which a substance easily gasified and expanded, such as isobutane, propane, or pentane is included in a shell having elasticity. The above-mentioned shell is frequently formed of a heat-meltable substance or a substance destroyed by heat expansion. Examples of the substance forming the shell include vinylidene chloride-acrylonitrile copolymers, polyvinyl alcohol, polyvinyl butyral, polymethyl methacrylate, polyacrylonitrile, polyvinylidene chloride, and polysulfone. The heat-expandable microsphere can be produced by a commonly used method such as a coacervation method, an interfacial polymerization method, or the like.

In this connection, as the heat-expandable microsphere, there can be used commercially available products, e.g., trade name "Matsumoto Microsphere" series manufactured by Matsumoto Yushi-Seiyaku Co., Ltd., such as trade name "Matsumoto Microsphere F30", trade name "Matsumoto Microsphere F301D", trade name "Matsumoto Microsphere F50D", trade name "Matsumoto Microsphere F501D", trade name "Matsumoto Microsphere F80SD", and trade name "Matsumoto Microsphere F80VSD", and also trade name "051DU", trade name "053DU", trade name "551DU", trade name "551-20DU", and trade name "551-80DU" manufactured by Expancel Company.

In the invention, as the foaming agent, a foaming agent other than the heat-expandable microsphere can be also used. As such a foaming agent, a foaming agent can be appropriately selected from various foaming agents such as various inorganic and organic foaming agents and used. Examples of representative inorganic foaming agents include ammonium carbonate, ammonium hydrogen carbonate, sodium hydrogen carbonate, ammonium nitrite, sodium borohydride, and various azides. Moreover, examples of representative organic foaming agents include water; chlorofluoroalkane-based compounds such as trichloromonofluoromethane and dichloromonofluoromethane; azo-based compounds such as azobisisobutyronitrile, azodicarbonamide, and barium azodicarboxylate; hydrazine-based compounds such as p-toluenesulfonylhydrazide, diphenylsulfone-3,3'-disulfonylhydrazide, 4,4'-oxybis(benzenesulfonylhydrazide), and allylbis(sulfonylhydrazide); semicarbazide-based compounds such as p-toluoylenesulfonylsemicarbazide and 4,4'-oxybis(benzenesulfonylsemicarbazide); triazole-based compounds such as 5-morpholinyl-1,2,3,4-thiatriazole; N-nitroso-based compounds such as N,N'-dinitrosopentamethylenetetramine and N,N'-dimethyl-N,N'-dinitrosoterephthalamide.

In the invention, as the foaming agent, there is suitably used a foaming agent having a foaming starting temperature ($T_0$, heat expansion starting temperature) ranging from 80° C. to 210° C., preferably 90° C. to 200° C., more preferably 95° C. to 200° C., and particularly preferably 100° C. to 170° C. When the foaming starting temperature of the foaming agent is 80° C. to 210° C., the foaming agent may be prevented from foaming by the heat during the production of the laminated ceramic sheet or during its use and also excessive heat resistance is not required for the base material and the like, so that the case is suitable in view of handling properties, productivity, and costs.

Incidentally, the foaming starting temperature ($T_0$) of the heat-expandable pressure-sensitive adhesive layer means minimum heating treatment temperature capable of reducing the adhesive force of the heat-expandable pressure-sensitive adhesive layer to 10% or less of the adhesive force before heating, by heating treatment of the heat-expandable pressure-sensitive adhesive layer. Therefore, the foaming starting temperature can be determined by measuring the minimum heating treatment temperature capable of reducing the adhesive force (pressure-sensitive adhesive force) of the heat-expandable pressure-sensitive adhesive layer containing the foaming agent (heat-expandable microsphere etc.) to 10% or less of the adhesive force before heating. Specifically, a polyethylene terephthalate film (trade name "Lumilar S10#25" (manufactured by Toray Industries, Inc.); sometimes referred to as "PET film") having a width of 20 mm and a thickness of 25 μm is attached on the surface of the heat-expandable pressure-sensitive adhesive layer containing the foaming agent (heat-expandable microsphere, etc.) of the heat-peelable pressure-sensitive adhesive sheet by means of a hand roller so as not to entrain air bubbles, to thereby prepare a test piece. With regard to the test piece, the PET film is peeled off at a peeling angle of 180° after 30 minutes of the attaching of the PET film, the pressure-sensitive adhesive force at that time (measuring temperature: 23° C., drawing rate: 300 mm/min, peeling angle: 180°) is then measured, and this pressure-sensitive adhesive force is regarded as "initial pressure-sensitive adhesive force". Moreover, the test piece produced by the above-mentioned method is placed in a heat-cycling drier set to each temperature (heating treatment temperature) for 1 minute and then taken out of the heat-cycling drier, followed by leaving it to stand at 23° C. for 2 hours. Thereafter, the PET film is peeled off at a peeling angle of 180°, the pressure-sensitive adhesive force at that time (measuring temperature: 23° C., drawing rate: 300 mm/min, peeling angle: 180°) is then measured, and this pressure-sensitive adhesive force is regarded as "pressure-sensitive adhesive force after heating treatment". Then, minimum heating treatment temperature at which the pressure-sensitive adhesive force after heating treatment becomes 10% or less of the initial pressure-sensitive adhesive force is regarded as the foaming starting temperature ($T_0$).

In the invention, since the adhesive force of the heat-expandable pressure-sensitive adhesive layer is efficiently and stably reduced by heating treatment, a foaming agent having an appropriate strength which does not burst until the volume expanding ratio reaches 5 times or more, 7 times or more, particularly 10 times or more is preferable.

The mixing amount of the foaming agent (heat-expandable microsphere, etc.) may be appropriately set depending on the expanding magnitude and the reduction degree of adhesive force of the heat-expandable pressure-sensitive adhesive layer but in general, the amount is, for example, 1 part by weight to 150 parts by weight, preferably 10 parts by weight to 130 parts by weight, and further preferably 25 parts by weight to 100 parts by weight based on 100 parts by weight of the base polymer which forms the heat-expandable pressure-sensitive adhesive layer.

In the case where the heat-expandable microsphere is used as the foaming agent, the particle diameter (average particle diameter) of the heat-expandable microsphere can be appropriately selected depending on the thickness of the heat-expandable pressure-sensitive adhesive layer and the like.

The average particle diameter of the heat-expandable microsphere can be, for example, selected from the range of 100 µm or less, preferably 80 µm or less, more preferably 1 µm to 50 µm, and particularly 1 µm to 30 µm. The particle diameter of the heat-expandable microsphere may be controlled in the process of forming the heat-expandable microsphere or may be controlled by means of classification or the like after the formation. The heat-expandable microsphere preferably has a uniform particle diameter.

In the invention, the heat-expandable pressure-sensitive adhesive layer may contain various additives (e.g., tackifiers, colorants, thickeners, extenders, fillers, plasticizers, antiaging agents, antioxidants, surfactants, crosslinking agents, etc.) within the range where the advantages of the invention are not impaired.

The tackifier is not particularly limited and can be appropriately selected from known tackifiers such as hydrocarbon-based tackifiers, ketone-based tackifiers, polyamide-based tackifiers, epoxy-based tackifiers, and elastomer-based tackifiers in addition to rosin-based tackifiers, terpene-based tackifiers, and phenol-based tackifiers, and used.

In the invention, the gel fraction of the heat-expandable pressure-sensitive adhesive layer can be effectively adjusted by the use of the crosslinking agent. The crosslinking agent is not particularly limited and known crosslinking agents can be used. Specifically, as the crosslinking agent, not only isocyanate-based crosslinking agents, epoxy-based crosslinking agents, melamine-based crosslinking agents, and peroxide-based crosslinking agents but also urea-based crosslinking agents, metal alkoxide-based crosslinking agents, metal chelate-based crosslinking agents, metal salt-based crosslinking agents, carbodiimide-based crosslinking agents, oxazoline-based crosslinking agents, aziridine-based crosslinking agents, amine-based crosslinking agents, and the like may be mentioned and isocyanate-based crosslinking agents and epoxy-based crosslinking agents are suitable. The crosslinking agents can be used alone or two or more types can be used in combination. Incidentally, the amount of the crosslinking agent is not particularly limited and can be appropriately selected depending on the gel fraction of the heat-expandable pressure-sensitive adhesive layer.

Examples of the isocyanate-based crosslinking agents include lower aliphatic polyisocyanates such as 1,2-ethylene diisocyanate, 1,4-butylene diisocyanate, and 1,6-hexamethylene diisocyanate; alicyclic polyisocyanates such as cyclopentylene diisocyanate, cyclohexylene diisocyanate, isophorone diisocyanate, hydrogenated tolylene diisocyanate, and hydrogenated xylylene diisocyanate; and aromatic polyisocyanates such as 2,4-tolylene diisocyanate, 2,6-tolylene diisocyanate, 4,4'-diphenylmethane diisocyanate, and xylylene diisocyanate. In addition, a trimethylolpropane/tolylene diisocyanate trimer adduct [trade name "COLONATE L" manufactured by Nippon Polyurethane Industry Co., Ltd.], a trimethylolpropane/hexamethylene diisocyanate trimer adduct [trade name "COLONATE HL" manufactured by Nippon Polyurethane Industry Co., Ltd.], and the like are also used. Moreover, examples of the epoxy-based crosslinking agents include N,N,N',N'-tetraglycidyl-m-xylenediamine, diglycidylaniline, 1,3-bis(N,N-glycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, polyglycerol polyglycidyl ether, sorbitan polyglycidyl ether, trimethylolpropane polyglycidyl ether, adipic acid diglycidyl ester, o-phthalic acid diglycidyl ester, triglycidyl-tris(2-hydroxyethyl) isocyanurate, resorcin diglycidyl ether, and bisphenol-S-diglycidyl ether, and also epoxy-based resins having two or more epoxy groups in the molecule.

In the invention, instead of the use of the crosslinking agent or together with the use of the crosslinking agent, it is also possible to perform the crosslinking treatment by irradiation with an electron beam or ultraviolet ray.

The heat-expandable pressure-sensitive adhesive layer can be, for example, formed by utilizing a commonly used method including mixing a pressure-sensitive adhesive, a foaming agent (heat-expandable microsphere, etc.), and optional solvent and other additives and shaping the mixture into a sheet-like layer. Specifically, the heat-expandable pressure-sensitive adhesive layer can be, for example, formed by a method including applying a mixture containing a pressure-sensitive adhesive, a foaming agent (heat-expandable microsphere, etc.), and optional solvent and other additives on a base material or a rubbery organic elastic layer, a method including applying the above-mentioned mixture on an appropriate separator such as a releasing paper to form a heat-expandable pressure-sensitive adhesive layer and transferring (transcribing) it on a base material or a rubbery organic elastic layer, or the like method.

The thickness of the heat-expandable pressure-sensitive adhesive layer is not particularly limited and can be appropriately selected depending on a reduction degree of the adhesive force. For example, the thickness is about 5 µm to 300 µm, preferably 5 µm to 80 µm, and further preferably 15 µm to 50 µM. However, in the case where the heat-expandable microsphere is used as the foaming agent, it is important that the thickness of the heat-expandable pressure-sensitive adhesive layer is larger than the maximum particle diameter of the heat-expandable microsphere contained therein. When the thickness of the heat-expandable pressure-sensitive adhesive layer is 5 µm or more, decrease in surface smoothness due to the unevenness of the foaming agent such as the heat-expandable microsphere can be prevented and thus the adhesiveness before heating (non-foaming state) can be effectively exhibited. In addition, the deformation degree of the heat-expandable pressure-sensitive adhesive layer by the heating treatment can be increased and thus the adhesive force can be smoothly reduced. Furthermore, when the heat-expandable pressure-sensitive adhesive layer is 300 µm or less, deformation of the heat-expandable pressure-sensitive adhesive layer during the cutting of small electronic parts can be prevented and a good cutting accuracy can be exhibited. In addition, after the expansion or foaming by the heating treatment, cohesion failure in the heat-expandable pressure-sensitive adhesive layer can be prevented and adhesive residue on the adherend can be effectively prevented. The heat-expandable pressure-sensitive adhesive layer may be either a single layer or a multi layer.

Incidentally, as the method for foaming the foaming agent in the heat-expandable pressure-sensitive adhesive layer, such a method can be suitably selected from known heat-foaming methods and adopted. Specifically, the heating treatment for foaming the foaming agent can be performed, for example, utilizing an appropriate heating means such as a hot plate, a hot-air drier, a near-infrared lamp, or an air drier. The heating temperature at the heating treatment may be the foaming starting temperature (heat expansion starting temperature) of the foaming agent (heat-expandable microsphere, etc.) in the heat-expandable pressure-sensitive adhesive layer or higher. The conditions for the heating treatment can be appropriately set depending on a decreasing profile of the adhesion area by the kind and the like of the foaming agent (heat-expandable microsphere, etc.), heat resistance of the base material, heating methods (heat capacity, heating means, etc.), and the like. General conditions for the heating treatment are as follows: temperature of 100° C. to 250° C. for 1 second to 90 seconds (hot plate and the like) or 5 minutes to 15 minutes (hot-air drier and the like). The heating treatment can be performed at an appropriate stage depending on the intended purpose of use. Moreover, there are cases where an infrared lamp or heated water can be used as a heat source at the heating treatment.

Rubbery Organic Elastic Layer

In FIG. 1, from the viewpoint of imparting deformation properties to the heat-peelable pressure-sensitive adhesive sheet and improving peelability thereof after heating, a rubbery organic elastic layer is provided between the base material and the heat-expandable pressure-sensitive adhesive layer but the rubbery organic elastic layer is a layer provided according to needs and may not necessarily be provided. As above, by providing the rubbery organic elastic layer, the surface of the above-mentioned heat-peelable pressure-sensitive adhesive sheet can be well followed to the surface shape of the adherend at the time of adhering the heat-peelable pressure-sensitive adhesive sheet to the adherend, whereby the adhesion area can be enlarged. In addition, the heat expansion of the heat-expandable pressure-sensitive adhesive layer can be highly (accurately) controlled at the time of heating and peeling the heat-peelable pressure-sensitive adhesive sheet from the adherend, whereby the heat-expandable pressure-sensitive adhesive layer can be expanded preferentially and uniformly in a thickness direction. Namely, the rubbery organic elastic layer can play an action to provide a large adhesion area by following the surface to the surface shape of the adherend when the heat-peelable pressure-sensitive adhesive sheet is adhered to the adherend and an action to facilitate the formation of a waving structure through three-dimensional structural change of the heat-expandable pressure-sensitive adhesive layer by reducing the restriction of foaming and/or expansion in a plane direction of the heat-peelable pressure-sensitive adhesive sheet when the heat-expandable pressure-sensitive adhesive layer is foamed and/or expanded by heating the heat-expandable pressure-sensitive adhesive layer for the purpose of peeling the adherend from the heat-peelable pressure-sensitive adhesive sheet.

The rubbery organic elastic layer is preferably provided on the surface of the heat-expandable pressure-sensitive adhesive layer at the base material side in the form overlaid on the heat-expandable pressure-sensitive adhesive layer. In this connection, the rubbery organic elastic layer can also be provided other than the position between the base material and the heat-expandable pressure-sensitive adhesive layer. The rubbery organic elastic layer can be interposed on one surface or both surfaces of the base material.

The rubbery organic elastic layer is preferably formed of a natural rubber, a synthetic rubber, or a synthetic resin having rubber elasticity, for example, which has a D-type Shore hardness in accordance with ASTM D-2240 of 50 or less, particularly 40 or less. Examples of the synthetic rubber or the synthetic resin having rubber elasticity include synthetic rubbers such as nitrile-based, diene-based, and acrylic ones; thermoplastic elastomers such as polyolefin-based and polyester-based ones; synthetic resins having rubber elasticity such as ethylene-vinyl acetate copolymers, polyurethanes, polybutadiene, and soft polyvinyl chloride. In this connection, even when a polymer is an essentially hard polymer such as polyvinyl chloride, rubber elasticity can be exhibited in combination with a blending agent such as a plasticizer or a softener. Such a composition can be also used as a constitutional material of the rubbery organic elastic layer. Moreover, a pressure-sensitive adhesive substance such as the pressure-sensitive adhesive constituting the heat-expandable pressure-sensitive adhesive layer can be also used as a constitutional material of the rubbery organic elastic layer.

The rubbery organic elastic layer can be formed by a formation method such as a method including applying a coating liquid containing a rubbery organic elastic layer-forming material such as the natural rubber, synthetic rubber, or synthetic resin having rubber elasticity (coating method), a method including adhering onto the base material a film composed of the rubbery organic elastic layer-forming material or a laminate film in which a layer composed of the rubbery organic elastic layer-constituting material is formed on one or more heat-expandable pressure-sensitive adhesive layers in advance (dry laminate method), or a method including co-extruding a resin composition containing a constitutional material of the base material and a resin composition containing the rubbery organic elastic layer-forming material (co-extrusion method).

The thickness of the rubbery organic elastic layer is, for example, about 5 µm to 300 µm, and preferably about 20 µm to 150 µm. When the thickness of the rubbery organic elastic layer is 5 µm to 300 µm, the three-dimensional structural change after heat foaming can be effectively achieved and thus the peelability can be effectively achieved. The rubbery organic elastic layer may be a single layer or may be constituted by two or more layers.

Incidentally, the rubbery organic elastic layer may be formed of a pressure-sensitive adhesive substance containing a natural rubber, a synthetic rubber, or a synthetic resin having rubber elasticity as a main component or may be formed of a foamed film mainly containing such a component. The foaming can be achieved by a commonly used method, e.g., a method by mechanical stirring, a method utilizing a reaction-formed gas, a method using a foaming agent, a method removing a soluble substance, a method by spraying, a method of forming a syntactic foam, a sintering method, or the like.

Other Layers

As the heat-peelable pressure-sensitive adhesive sheet of the invention, a heat-expandable pressure-sensitive adhesive layer may be formed on at least one surface of the base material. For example, a heat-peelable pressure-sensitive adhesive sheet having a form where the heat-expandable pressure-sensitive adhesive layer is formed on one surface of the base material, a heat-peelable pressure-sensitive adhesive sheet having a form where the heat-expandable pressure-sensitive adhesive layer is formed on each surface of the base material, and a heat-peelable pressure-sensitive adhesive sheet having a form where the heat-expandable pressure-sensitive adhesive layer is formed on one surface of the base material and a non-heat-expandable pressure-sensitive adhesive layer (a pressure-sensitive adhesive layer having no heat-expandability) is formed on the other surface of the base material are mentioned. Incidentally, in the case where the heat-expandable pressure-sensitive adhesive layer is formed on each surface of the base material, at least one heat-expandable pressure-sensitive adhesive layer may have the above-mentioned characteristics. Moreover, the heat-peelable pressure-sensitive adhesive sheet of the invention may have one or two or more intermediate layers (rubbery organic elastic layer, etc.) between the base material and the heat-expandable pressure-sensitive adhesive layer.

(Non-Heat-Expandable Pressure-Sensitive Adhesive Layer)

The pressure-sensitive adhesive for forming the non-heat-expandable pressure-sensitive adhesive layer is not particularly limited and known or commonly used pressure-sensitive adhesives such as pressure-sensitive adhesives exemplified as the pressure-sensitive adhesives to be used in the above-mentioned heat-expandable pressure-sensitive adhesive layer (e.g., acrylic pressure-sensitive adhesives, rubber-based pressure-sensitive adhesives, vinyl alkyl ether-based pressure-sensitive adhesives, silicone-based pressure-sensitive adhesives, polyester-based pressure-sensitive adhesives, polyamide-based pressure-sensitive adhesives, urethane-based pressure-sensitive adhesives, fluorine-based pressure-sensitive adhesives, styrene-diene block copolymer-based pressure-sensitive adhesives, creep characteristic-improved pressure-sensitive adhesives, radiation curable pressure-sensitive adhesives, etc.) can be used. These pressure-sensitive adhesives can be used alone or two or more types can be used in combination. In this connection, the gel fraction of the non-heat-expandable pressure-sensitive adhesive layer is not particularly limited. Moreover, the glass transition temperature of the non-heat-expandable pressure-sensitive adhesive layer is also not particularly limited. Moreover, in the pressure-sensitive adhesive for forming the non-heat-expandable pressure-sensitive adhesive layer, for example, known or commonly used additives such as tackifiers, colorants, thickeners, extenders, fillers, plasticizers, antiaging agents, antioxidants, surfactants, and crosslinking agents may be blended.

The thickness of the non-heat-expandable pressure-sensitive adhesive layer may be, for example, 300 μm or less (for example, 1 μm to 300 μm, and preferably 5 μm to 100 μm). As the method of forming the non-heat-expandable pressure-sensitive adhesive layer, a method similar to the case of the above-mentioned heat-expandable pressure-sensitive adhesive layer (e.g., a method including application on the base material, a method including application on a separator to form a pressure-sensitive adhesive layer and subsequent transcription thereof, or the like method) can be utilized. Incidentally, the non-heat-expandable pressure-sensitive adhesive layer may be either a single layer or a multi layer.

(Intermediate Layer)

Moreover, in the heat-peelable pressure-sensitive adhesive sheet of the invention, as mentioned above, an intermediate layer may be provided between the base material and the heat-expandable pressure-sensitive adhesive layer. As such an intermediate layer, there may be mentioned a coating layer of a peeling agent for the purpose of imparting the peelability, a coating layer of an undercoating agent for the purpose of improving the adhesive force, and the like. In this connection, examples of the intermediate layer other than the coating layer of a peeling agent and the coating layer of an undercoating agent include a layer for the purpose of imparting good deformation properties, a layer for the purpose of increasing the adhesion area to the adherend, a layer for the purpose of improving the adhesive force, a layer for the purpose of achieving a good following ability to the surface shape of the adherend, a layer for the purpose of improving processing ability for reducing the adhesive force by heating, and a layer for the purpose of improving the peelability from the adherend after heating. The above-mentioned rubbery organic elastic layer is also one type of the intermediate layer.

The heat-peelable pressure-sensitive adhesive sheet of the invention may have a form of a double-sided adhesive sheet where both surfaces thereof are adhesive surfaces but preferably has a form of an adhesive sheet where only one surface thereof is an adhesive surface. Therefore, the heat-peelable pressure-sensitive adhesive sheet is suitably a heat-peelable pressure-sensitive adhesive sheet having a form where the heat-expandable pressure-sensitive adhesive layer is formed on one surface of the base material.

Moreover, the heat-peelable pressure-sensitive adhesive sheet may be formed in a form where it is wound as a roll or may be formed in a form where the sheet is laminated. For example, in the case where the sheet has the form where it is wound as a roll, the sheet is wound as a roll in a state that the heat-expandable pressure-sensitive adhesive layer is protected by a separator, that is, the sheet is wound as a roll in a state that it is constituted by the base material, the heat-expandable pressure-sensitive adhesive layer formed on one surface of the base material, and the separator formed on the heat-expandable pressure-sensitive adhesive layer, whereby the sheet can be prepared as a heat-peelable pressure-sensitive adhesive sheet in a state or form where it is wound as a roll. In this connection, the heat-peelable pressure-sensitive adhesive sheet in the state or form where it is wound as a roll may be constituted by the base material, the heat-expandable pressure-sensitive adhesive layer formed on one surface of the base material, and a release-treated layer (backside-treated layer) formed on the other surface of the base material.

As above, the heat-peelable pressure-sensitive adhesive sheet of the invention can have a form such as a sheet form or a tape form.

In the heat-peelable pressure-sensitive adhesive sheet of the invention, the heat-expandable pressure-sensitive adhesive layer has pressure-sensitive adhesive force capable of exhibiting a sufficient pressure-sensitive adhesiveness at cut-processing not only at room temperature but also under a high temperature atmosphere. As the pressure-sensitive adhesive force of the heat-expandable pressure-sensitive adhesive layer, for example, the pressure-sensitive adhesive force at 23° C. (peeling angle: 180° C., drawing rate: 300 mm/min) is preferably 2 N/20 mm width or more (2 N/20 mm width to 20 N/20 mm width) and further preferably 4 N/20 mm width or more (4 N/20 mm width to 20 N/20 mm width).

Moreover, in the heat-expandable pressure-sensitive adhesive layer, the pressure-sensitive adhesive force at 80° C. (peeling angle: 180°, drawing rate: 300 mm/min) is preferably 1 N/20 mm width or more (1 N/20 mm width to 15 N/20 mm width) and further preferably 3 N/20 mm width or more (3 N/20 mm width to 15 N/20 mm width).

The pressure-sensitive adhesive force (measuring temperature: 23° C. or 80° C.) can be measured by the following measurement method.

<Measurement Method of Pressure-Sensitive Adhesive Force at 23° C.>

The heat-peelable pressure-sensitive adhesive sheet is cut into a size having a width of 20 mm and a length of 140 mm and, after a polyethylene terephthalate film (trade name "Lumilar S-10" manufactured by Toray Industries, Inc.; thickness: 25 μm, width: 20 mm) as an adherend is attached on the heat-expandable pressure-sensitive adhesive layer in accordance to JIS Z 0237 (specifically, they are attached by reciprocating a 2 kg roller once under an atmosphere of a temperature of 23±2° C. and a humidity of 65±5% RH), the resulting sheet is set on a tensile testing machine fitted with a constant-temperature bath set at 23° C. and allowed to stand for 30 minutes. After standing, a load at the time when the adherend is peeled under a temperature of 23° C. from the heat-peelable pressure-sensitive adhesive sheet under conditions of a peeling angle of 180° and a peeling rate (drawing rate) of 300 mm/min is measured and a maximum load at that time (a maximum value of the load excluding a peak top at the initial stage of the measurement) is determined, the maximum load being regarded as the pressure-sensitive adhesive force (N/20 mm width) of the heat-expandable pressure-sensitive adhesive layer.

<Measurement Method of Pressure-Sensitive Adhesive Force at 80° C.>

The heat-peelable pressure-sensitive adhesive sheet is cut into a size having a width of 20 mm and a length of 140 mm and, after a polyethylene terephthalate film (trade name "Lumilar S-10" manufactured by Toray Industries, Inc.; thickness: 25 μm, width: 20 mm) as an adherend is attached on the heat-expandable pressure-sensitive adhesive layer in accordance to JIS Z 0237 (specifically, they are attached by reciprocating a 2 kg roller once under an atmosphere of a temperature of 23±2° C. and a humidity of 65±5% RH), the resulting sheet is set on a tensile testing machine fitted with a constant-temperature bath set at 80° C. beforehand and allowed to stand for 30 minutes. After standing, a load at the time when the adherend is peeled under an atmosphere of 80° C. from the heat-peelable pressure-sensitive adhesive sheet under conditions of a peeling angle of 180° and a peeling rate (drawing rate) of 300 mm/min is measured and a maximum load at that time (a maximum value of the load excluding a peak top at the initial stage of the measurement) is determined, the maximum load being regarded as the pressure-sensitive adhesive force (N/20 mm width) of the heat-expandable pressure-sensitive adhesive layer.

Separator

In the invention, commonly used release paper or the like can be used as the separator. The separator is used as a protective material of the heat-expandable pressure-sensitive adhesive layer and is peeled off at the time when the heat-peelable pressure-sensitive adhesive sheet is attached to the adherend. The separator is not necessarily provided. As the separator, for example, base materials having a release layer, such as plastic films and papers whose surface is treated with a releasing agent such as silicone-based one, long-chain alkyl-based one, fluorine-based one, or molybdenum sulfide; low adhesive base materials composed of fluorine-based polymers such as polytetrafluoroethylene, polychlorotrifluoroethylene, polyvinyl fluoride, polyvinylidene fluoride, tetrafluoroethylene-hexafluoropropylene copolymers, and chlorofluoroethylene-vinylidene fluoride copolymers; and low adhesive base materials composed of non-polar polymers such as olefinic resins (e.g., polyethylene, polypropylene, etc.) can be used. In this connection, it is also possible to use the separator as a base material for supporting the heat-expandable pressure-sensitive adhesive layer.

Incidentally, the separator can be formed by known or commonly used methods. Moreover, the thickness of the separator is not particularly limited.

Cut-Processing Method of Laminated Ceramic Sheet

The heat-peelable pressure-sensitive adhesive sheet of the invention is suitably used for temporary fixing at the cut-processing of the laminated ceramic sheet. The cut-processing method of the laminated ceramic sheet using the heat-peelable pressure-sensitive adhesive sheet of the invention includes the following steps:

a step of attaching the laminated ceramic sheet to the heat-peelable pressure-sensitive adhesive sheet for the laminated ceramic sheet according to the invention; and a step of subjecting the laminated ceramic sheet to a cut-processing treatment.

Specifically, the laminated ceramic sheet is attached as an article to be processed (adherend) on the heat-expandable pressure-sensitive adhesive layer of the heat-peelable pressure-sensitive adhesive sheet. On this occasion, the laminated ceramic sheet can be firmly fixed to a support (pedestal etc.) by fixing the other surface of the heat-peelable pressure-sensitive adhesive sheet to the support (pedestal etc.). As above, the laminated ceramic sheet can be subjected to a cut-processing treatment (a polishing treatment step, a dicing step, etc.) in a state that the laminated ceramic sheet is fixed to the support via the heat-peelable pressure-sensitive adhesive sheet.

Incidentally, at the fixing of the laminated ceramic sheet to the support such as pedestal, in the case where a pressure-sensitive adhesive layer (other heat-expandable pressure-sensitive adhesive layer such as non-heat-expandable pressure-sensitive adhesive layer) is formed on the surface of the heat-peelable pressure-sensitive adhesive sheet opposite to the surface having the heat-expandable pressure-sensitive adhesive layer thereon, a fixing means using the pressure-sensitive adhesive layer can be utilized. On the other hand, in the case where a pressure-sensitive adhesive layer is not formed on the other surface, various fixing means such as an adhesive can be utilized.

Moreover, the pedestal (support) for fixing the laminated ceramic sheet is not particularly limited and can be appropriately selected from known or commonly used pedestals used at cut-processing of the laminated ceramic sheet and used. For example, stainless plates, glass plates, dummy wafers, and the like may be mentioned. The pedestal can be appropriately selected depending on the kind of the laminated ceramic sheet, the cut-processing method of the laminated ceramic sheet, and the like.

As the laminated ceramic sheet, known laminated ceramic sheets can be used. As the laminated ceramic sheet, there may be, for example, mentioned a laminated ceramic sheet having a constitution that a necessary number of green sheets each having an electrode printed on one surface thereof are laminated so that the surface on which the electrode is printed and the surface on which the electrode is not printed are alternately located.

In the invention, after the laminated ceramic sheet is attached and fixed on the heat-peelable pressure-sensitive adhesive sheet, the laminated ceramic sheet is subjected to a cut-processing treatment and is, for example, cut (particularly, push-cutting cut-processing) so as to be a chip form having a size of individual parts, whereby a chip-form electronic part as a processed article (laminated ceramic sheet after cutting) can be formed. In this connection, the cut-processing step is frequently performed under a high-temperature atmosphere (lower than a heat-peeling treatment temperature of the heat-expandable pressure-sensitive adhesive layer in the heat-peelable pressure-sensitive adhesive sheet of the invention (or a foaming starting temperature of the foaming agent), e.g., 60° C. to 100° C.) but, in the heat-peelable pressure-sensitive adhesive sheet of the invention, since the gel fraction of the heat-expandable pressure-sensitive adhesive layer is 50% by weight or more and the glass transition temperature of the heat-expandable pressure-sensitive adhesive layer is −40° C. to 30° C., cohesive force and pressure-sensitive adhesive force at normal temperature and under a high-temperature atmosphere are excellent, sufficient pressure-sensitive adhesive force and holding force are exhibited even under such a high-temperature atmosphere, and thus the laminated ceramic sheet can be firmly fixed throughout the period before and after the cut-processing step. Therefore, when the heat-peelable pressure-sensitive adhesive sheet of the invention is used, detachment of chips during the processing can be prevented to suppress or prevent chip fly at the processing, so that decrease in process yield to be brought thereby can also be suppressed or prevented. Accordingly, when the heat-peelable pressure-sensitive adhesive sheet of the invention is used, the laminated ceramic sheet can be subjected to the cut-processing treatment in high cutting accuracy and thus chip-form electronic parts can be effectively produced.

After completion of the cutting, the chip-form electronic parts can be easily peeled from the heat-peelable pressure-sensitive adhesive sheet by a heat-peeling treatment without generating fouling such as adhesive residue. Specifically, after the completion of the cutting, the heat-expandable pressure-sensitive adhesive layer is heated to the foaming starting temperature of the foaming agent (heat-expandable microsphere, etc.) or higher to foam or expand the heat-expandable pressure-sensitive adhesive layer and thereby the pressure-sensitive adhesive force of the heat-expandable pressure-sensitive adhesive layer is diminished or reduced, so that the processed article (laminated ceramic sheet after cutting) can be removed from the heat-expandable pressure-sensitive adhesive layer. On this occasion, the conditions for the heating treatment for peeling the laminated ceramic sheet after cutting from the heat-expandable pressure-sensitive adhesive layer are determined depending on a decreasing profile of the adhesion area by the surface state of the laminated ceramic sheet, the kind of the foaming agent, and the like, heat resistance of the base material and the adherend, and the heating method but general conditions are, as mentioned above, 100° C. to 250° C. for 1 second to 90 seconds (hot plate and the like) or 5 minutes to 15 minutes (hot-air drier and the like). In this connection, the heating treatment can also be performed at an appropriate stage depending on the intended purpose of use. Moreover, as a heating source, an infrared lamp or heated water can be used in some cases.

Incidentally, the heat-peelable pressure-sensitive adhesive sheet can be peeled from the pedestal by peeling or the like after the laminated ceramic sheet subjected to cutting is recovered by an appropriate method.

The chip-form electronic part as the laminated ceramic sheet after the cut-processing treatment is suitably used as a material for electronic parts (laminated ceramic condensers, etc.).

EXAMPLES

The following will illustratively describe preferred examples of the invention in detail. However, the materials, the mixing amount, and the like described in these examples are not intended to limit the scope of the invention to only those unless otherwise stated, and they are merely explanatory examples. Moreover, part in each example is a weight standard unless otherwise stated.

Example 1

Into 100 parts of a polymer consisting of ethyl acrylate, n-butyl acrylate, and acrylic acid (ethyl acrylate/n-butyl acrylate/acrylic acid=20 parts/80 parts/10 parts) were homogeneously mixed 1 part of an epoxy-based crosslinking agent (trade name "Tetrad-C" manufactured by Mitsubishi Gas Chemical Co., Inc.), 5 parts of a rosin-based tackifier (trade name "TAMANOL 361" manufactured by Arakawa Chemical Co., Ltd), 30 parts of a foaming agent (heat-expandable microsphere; trade name "Matsumoto Microsphere F-501" manufactured by Matsumoto Yushi-Seiyaku Co., Ltd.; 120° C. foaming and expanding type), and toluene. The dissolved coating solution was applied on one surface of a supporting base material (trade name "Lumilar S10" manufactured by Toray Industries, Inc.; thickness: 100 µm) so that the thickness after drying became 50 µm and then dried, thereby a heat-peelable pressure-sensitive adhesive sheet (sometimes referred to as "heat-peelable pressure-sensitive adhesive sheet 1") being obtained.

Example 2

Into 100 parts of a polymer consisting of 2-ethylhexyl acrylate, n-butyl acrylate, and acrylic acid (2-ethylhexyl acrylate/n-butyl acrylate/acrylic acid=50 parts/50 parts/5 parts) were homogeneously mixed 2 parts of an epoxy-based crosslinking agent (trade name "Tetrad-C" manufactured by Mitsubishi Gas Chemical Co., Inc.), 10 parts of a terpene phenol-based tackifier (trade name "YS Polystar U115" manufactured by Yasuhara Chemical Co., Ltd), 30 parts of a foaming agent (heat-expandable microsphere; trade name "Matsumoto Microsphere F-501" manufactured by Matsumoto Yushi-Seiyaku Co., Ltd.; 120° C. foaming and expanding type), and toluene. The dissolved coating solution was applied on one surface of a supporting base material (trade name "Lumilar S10" manufactured by Toray Industries, Inc.; thickness: 100 µm) so that the thickness after drying became 50 µm and then dried, thereby a heat-peelable pressure-sensitive adhesive sheet (sometimes referred to as "heat-peelable pressure-sensitive adhesive sheet 2") being obtained.

Example 3

Into 100 parts of a polymer consisting of 2-ethylhexyl acrylate and acrylic acid (2-ethylhexyl acrylate/acrylic acid=97 parts/3 parts) were homogeneously mixed 0.5 part of an epoxy-based crosslinking agent (trade name "Tetrad-C" manufactured by Mitsubishi Gas Chemical Co., Inc.), 5 parts of a rosin-based tackifier (trade name "TAMANOL 361" manufactured by Arakawa Chemical Co., Ltd), 30 parts of a foaming agent (heat-expandable microsphere; trade name "Matsumoto Microsphere F-501" manufactured by Matsumoto Yushi-Seiyaku Co., Ltd.; 120° C. foaming and expanding type), and toluene. The dissolved coating solution was applied on one surface of a supporting base material (trade name "Lumilar S10" manufactured by Toray Industries, Inc.; thickness: 100 µm) so that the thickness after drying became 50 µm and then dried, thereby a heat-peelable pressure-sensitive adhesive sheet (sometimes referred to as "heat-peelable pressure-sensitive adhesive sheet 3") being obtained.

Example 4

Into 100 parts of a syrup of a polymer obtained by mixing 2-ethylhexyl acrylate, ethyl acrylate, acrylic acid, and a photopolymerization initiator in a ratio of 2-ethylhexyl acrylate/ethyl acrylate/acrylic acid/photopolymerization initiator=30 parts/70 parts/5 parts/0.05 part and partially polymerizing them under a nitrogen atmosphere by ultraviolet ray irradiation (weight-average molecular weight of the polymer was 10,000 or more) were added and mixed 30 parts of a foaming agent (heat-expandable microsphere; trade name "Matsumoto Microsphere F-501" manufactured by Matsumoto Yushi-Seiyaku Co., Ltd.; 120° C. foaming and expanding type), 0.2 part by weight of trimethylolpropane triacrylate, 7 parts of a rosin-based tackifier (trade name "TAMANOL 361" manufactured by Arakawa Chemical Industries, Ltd), and 0.05 part of the photopolymerization initiator the same as above. The mixed coating solution was applied on one surface of a supporting base material (trade name "Lumilar S10" manufactured by Toray Industries, Inc.; thickness: 100 µm) so that the thickness after drying and curing became 50 and the solution was subjected to a photopolymerization treatment by irradiation with 700 mJ/cm² of an ultraviolet ray (wavelength: 352 nm) through a high-pressure mercury lamp of a light intensity of 5 mV/cm² under a liquid nitrogen-filled apparatus, thereby a heat-peelable pressure-sensitive adhesive sheet (sometimes referred to as "heat-peelable pressure-sensitive adhesive sheet 4") being obtained.

Comparative Example 1

Into 100 parts of a polymer consisting of n-butyl acrylate, ethyl acrylate, and acrylic acid (n-butyl acrylate/ethyl acrylate/acrylic acid=30 parts/70 parts/5 parts) were homogeneously mixed 1 part of an epoxy-based crosslinking agent (trade name "Tetrad-C" manufactured by Mitsubishi Gas Chemical Co., Inc.), 40 parts of a terpene phenol-based tackifier (trade name "YS Polystar U115" manufactured by Yasuhara Chemical Co., Ltd), 30 parts of a foaming agent (heat-expandable microsphere; trade name "Matsumoto Microsphere F-501" manufactured by Matsumoto Yushi-Seiyaku Co., Ltd.; 120° C. foaming and expanding type), and toluene. The dissolved coating solution was applied on one surface of a supporting base material (trade name "Lumilar S10" manufactured by Toray Industries, Inc.; thickness: 100 μm) so that the thickness after drying became 50 μm and then dried, thereby a heat-peelable pressure-sensitive adhesive sheet (sometimes referred to as "heat-peelable pressure-sensitive adhesive sheet 5") being obtained.

Comparative Example 2

Into 100 parts of a polymer consisting of 2-ethylhexyl acrylate and 2-hydroxyethyl acrylate (2-ethylhexyl acrylate/2-hydroxyethyl acrylate=100 parts/3 parts) were homogeneously mixed 0.8 part of an isocyanate-based crosslinking agent (trade name "COLONATE L" manufactured by Nippon Polyurethane Industry Co., Ltd.), 5 parts of a rosin-based tackifier (trade name "TAMANOL 361" manufactured by Arakawa Chemical Co., Ltd), 30 parts of a foaming agent (heat-expandable microsphere; trade name "Matsumoto Microsphere F-501" manufactured by Matsumoto Yushi-Seiyaku Co., Ltd.; 120° C. foaming and expanding type), and toluene. The dissolved coating solution was applied on one surface of a supporting base material (trade name "Lumilar S10" manufactured by Toray Industries, Inc.; thickness: 100 μm) so that the thickness after drying became 50 μm and then dried, thereby a heat-peelable pressure-sensitive adhesive sheet (sometimes referred to as "heat-peelable pressure-sensitive adhesive sheet 6") being obtained.

Comparative Example 3

Into 100 parts of a polymer consisting of 2-ethylhexyl acrylate and acrylic acid (2-ethylhexyl acrylate/acrylic acid=90 parts/7 parts) were homogeneously mixed 0.3 part of an epoxy-based crosslinking agent (trade name "Tetrad-C" manufactured by Mitsubishi Gas Chemical Co., Inc.), 25 parts of a terpene phenol-based tackifier (trade name "YS Polystar U115" manufactured by Yasuhara Chemical Co., Ltd), 30 parts of a foaming agent (heat-expandable microsphere; trade name "Matsumoto Microsphere F-501" manufactured by Matsumoto Yushi-Seiyaku Co., Ltd.; 120° C. foaming and expanding type), and toluene. The dissolved coating solution was applied on one surface of a supporting base material (trade name "Lumilar S10" manufactured by Toray Industries, Inc.; thickness: 100 μm) so that the thickness after drying became 50 μm and then dried, thereby a heat-peelable pressure-sensitive adhesive sheet (sometimes referred to as "heat-peelable pressure-sensitive adhesive sheet 7") being obtained.

(Evaluation)

On the heat-peelable pressure-sensitive adhesive sheets 1 to 7 prepared in Examples 1 to 4 and Comparative Examples 1 to 3, the gel fraction of the heat-expandable pressure-sensitive adhesive layer, glass transition temperature (Tg) of the heat-expandable pressure-sensitive adhesive layer, pressure-sensitive adhesive force at 23° C., and pressure-sensitive adhesive force at 80° C. were measured by the following measurement methods and also chip fly preventive properties, heat-peelability, and antifouling properties at the time when the laminated ceramic sheet was attached thereto and chip formation was performed by push-cutting cut-processing under a high-temperature atmosphere were evaluated by the following evaluation methods. The results are shown in Table 1.

(Measurement Method of Gel Fraction)

About 0.1 g of a sample was sampled from a heat-expandable pressure-sensitive adhesive layer (not subjected to a heating treatment for heat expansion) in each heat-peelable pressure-sensitive adhesive sheet and precisely weighed (weight of sample) and, after the sample was wrapped in a mesh-type sheet (made of Teflon (registered trademark)), was immersed in about 50 ml of toluene at room temperature for 1 week. Thereafter, a solvent-insoluble matter (content in the mesh-type sheet) was taken out of the toluene and dried at 130° C. for about 2 hours by placing it in a drying machine, the solvent-insoluble matter after drying was weighed (weight after immersion and drying), and then the gel fraction (% by weight) was calculated according to the following equation (a). The measured results of the gel fraction are shown in the column of "Gel fraction (% by weight)" in Table 1.

$$\text{Gel Fraction (\% by weight)} = [(\text{Weight after Immersion and Drying})/(\text{Weight of Sample})] \times 100 \qquad (a)$$

(Measurement Method of Glass Transition Temperature)

On each Example and each Comparative Example, a plurality of the heat-peelable pressure-sensitive adhesive sheets (a heating treatment for heat expansion has not been performed) were attached to each other (the heat-expandable pressure-sensitive adhesive layer of one heat-peelable pressure-sensitive adhesive sheet was attached to the base material of another heat-peelable pressure-sensitive adhesive sheet) to prepare a sheet whose total thickness of the heat-expandable pressure-sensitive adhesive layers was 2 mm, which was then punched out into a disk by means of a punch having a diameter of 7.9 mm, thereby a sample for measuring glass transition temperature being prepared. The sample (disk-shaped sample having a diameter of 7.9 mm and a thickness of 2 mm) was sandwiched between a pair of stainless steel parallel plates having a diameter of 8 mm (manufactured by TA Instruments; Model 708.0157), viscoelasticity was measured in the temperature range of −70° C. to 150° C. at a temperature-elevating rate of 5° C./minute and in a shear mode while shear strain was imparted at a chuck pressure of 100 g-weight and at a frequency of 1 Hz using a dynamic viscoelasticity spectrometer (manufactured by Rheometric Scientific Company; product name "ARES"), and temperature at a maximum value of loss tangent (tan δ) was determined, the temperature at a maximum value of loss tangent being regarded as the glass transition temperature (Tg). The measured results of the glass transition temperature are shown in the column of "Glass transition temperature (Tg) (° C.)" in Table 1.

(Measurement Method of Pressure-Sensitive Adhesive Force at 23° C.)

Each heat-peelable pressure-sensitive adhesive sheet was cut into a size having a width of 20 mm and a length of 140 mm and, after a polyethylene terephthalate film (trade name "Lumilar S-10" manufactured by Toray Industries, Inc.; thickness: 25 μm, width: 20 mm) as an adherend was attached on the heat-expandable pressure-sensitive adhesive layer in accordance to JIS Z 0237 (specifically, they are attached by reciprocating a 2 kg roller once under an atmosphere of a temperature of 23±2° C. and a humidity of 65±5% RH), the resulting sheet was set on a tensile testing machine (trade name "Shimadzu Autograph AG-1 20 kN" manufactured by Shimadzu Corporation) fitted with a constant-temperature bath set at 23° C. and allowed to stand for 30 minutes. After standing, a load at the time when the adherend was peeled under a temperature of 23° C. from the heat-peelable pressure-sensitive adhesive sheet under conditions of a peeling angle of 180° and a peeling rate (drawing rate) of 300 mm/min was measured and a maximum load at that time (a maximum value of the load excluding a peak top at the initial stage of the measurement) was determined, the maximum load being regarded as the pressure-sensitive adhesive force (N/20 mm width) of the heat-expandable pressure-sensitive adhesive layer. The measured results of the pressure-sensitive adhesive force are shown in the column of "Pressure-sensitive adhesive force at 23° C." in Table 1.

<Measurement Method of Pressure-Sensitive Adhesive Force at 80° C.>

Each heat-peelable pressure-sensitive adhesive sheet was cut into a size having a width of 20 mm and a length of 140 mm and, after a polyethylene terephthalate film (trade name "Lumilar S-10" manufactured by Toray Industries, Inc.; thickness: 25 μm, width: 20 mm) as an adherend was attached on the heat-expandable pressure-sensitive adhesive layer in accordance to JIS Z 0237 (specifically, they are attached by reciprocating a 2 kg roller once under an atmosphere of a temperature of 23±2° C. and a humidity of 65±5% RH), the resulting sheet was set on a tensile testing machine (trade name "Shimadzu Autograph AG-1 20 kN" manufactured by Shimadzu Corporation) fitted with a constant-temperature bath set at 80° C. beforehand and allowed to stand for 30 minutes. After standing, a load at the time when the adherend was peeled under an atmosphere of 80° C. from the heat-peelable pressure-sensitive adhesive sheet under conditions of a peeling angle of 180° and a peeling rate (drawing rate) of 300 mm/min was measured and a maximum load at that time (a maximum value of the load excluding a peak top at the initial stage of the measurement) was determined, the maximum load being regarded as the pressure-sensitive adhesive force (N/20 mm width) of the heat-expandable pressure-sensitive adhesive layer. The measured results of the pressure-sensitive adhesive force are shown in the column of "Pressure-sensitive adhesive force at 80° C." in Table 1.

(Evaluation Method of Cut-Processing Ability/Heat-Peelability/Antifouling Properties)

A laminated ceramic sheet (size: 100 mm×100 mm×thickness 2 mm; unevenness of 20 μm has been formed on the surface; before baking) was attached on the heat-expandable pressure-sensitive adhesive layer of each heat-peelable pressure-sensitive adhesive sheet (temporary fixing), it was mounted and fixed on a dicing ring and was fully cut into chips having a size of 0.6 mm×0.3 mm through a push-cutting blade (subjected to a cut-processing treatment by push-cutting cut-processing), and it was visually confirmed whether the chip detachment was generated or not at the cutting. The ratio (chip fly ratio) (%) of the number of the cut-processed chips detached from the heat-peelable pressure-sensitive adhesive sheet was determined and chip-fly preventive properties (cut-processing properties) were evaluated. Incidentally, in the case where all chips are attached to the heat-peelable pressure-sensitive adhesive sheet and are not detached, the chip fly ratio is determined to be 0% (namely, the chip fly ratio is 0%). Therefore, when the ratio of the chips detached (chip fly ratio) is small, it means that the chip-fly preventive properties are good. The evaluation results of the chip-fly preventive properties are shown in the column of "Chip-fly preventive properties (%)" in Table 1.

Moreover, after the above-mentioned cutting, a heating treatment was performed at 120° C. for 10 minutes using a constant-temperature apparatus (hot-air drier) ("SPH-201" manufactured by Espec Corporation). After the heating treatment, the heat-peelable pressure-sensitive adhesive sheet was turned upside down in the air (so that the chips are put down), the chips were peeled from the heat-peelable pressure-sensitive adhesive sheet by free falling, and a ratio (heat-peeling ratio) (%) of the chips which have been peeled and have not remained was determined as heat-peelability. Incidentally, in the case where all chips are peeled and do not remain on the heat-peelable pressure-sensitive adhesive sheet, the heat-peeling ratio is determined to be 100%. Therefore, when the non-remaining ratio of the chips by peeling (heat-peeling ratio) is large, it means that the heat-peelability is good. The evaluation results of the heat-peelability are shown in the column of "Heat-peelability (%)" in Table 1.

Furthermore, on the chips peeled from the heat-peelable pressure-sensitive adhesive sheet by the above-mentioned free falling, the surface (surface to which the heat-peelable pressure-sensitive adhesive sheet had been attached) was visually observed and the degree of the fouling on the chip surface was visually evaluated according to the following standard, thereby the antifouling properties being evaluated. The evaluation results of the antifouling properties are shown in the column of "Antifouling properties" in Table 1.

Evaluation Standard of Antifouling Properties

Good: Fouling by adhesive residue was not observed on chip surface

Poor: Fouling by adhesive residue was observed on chip surface

TABLE 1

|  | Glass transition temperature (Tg) (° C.) | Gel fraction (% by weight) | Pressure-sensitive adhesive force at 23° C. (N/20 mm) | Pressure-sensitive adhesive force at 80° C. (N/20 mm) | Chip fly preventive properties (%) | Heat-peelability (%) | Antifouling properties |
|---|---|---|---|---|---|---|---|
| Example 1 | 15 | 92 | 6.5 | 5.1 | 0 | 100 | Good |
| Example 2 | 0 | 79 | 9.0 | 6.5 | 0 | 100 | Good |
| Example 3 | −5 | 85 | 6.4 | 4.6 | 0 | 100 | Good |
| Example 4 | −15 | 73 | 7.1 | 3.2 | 15 | 85 | Good |

TABLE 1-continued

| | Glass transition temperature (Tg) (° C.) | Gel fraction (% by weight) | Pressure-sensitive adhesive force at 23° C. (N/20 mm) | Pressure-sensitive adhesive force at 80° C. (N/20 mm) | Chip fly preventive properties (%) | Heat-peelability (%) | Antifouling properties |
|---|---|---|---|---|---|---|---|
| Comparative Example 1 | 35 | 73 | Impossible to attach | | | | — |
| Comparative Example 2 | −45 | 86 | 4.0 | 1.5 | 60 | 40 | Good |
| Comparative Example 3 | 5 | 36 | 8.3 | 2.3 | 40 | 0 | Poor |

From Table 1, it was confirmed that the heat-peelable pressure-sensitive adhesive sheets according to Examples 1 to 4 could be effectively subjected to a push-cutting cut-processing without generating chip detachment and the adherend (cut-processed chip) could be easily peeled off by heating without generating fouling.

On the other hand, in the heat-peelable pressure-sensitive adhesive sheet according to Comparative Example 1, since the glass transition temperature of the heat-expandable pressure-sensitive adhesive layer exceeded 30° C., initial tackiness to the adherend was not obtained, so that the sheet could not be attached to the adherend. Moreover, in the heat-peelable pressure-sensitive adhesive sheet according to Comparative Example 2, since the glass transition temperature of the heat-expandable pressure-sensitive adhesive layer was lower than −40° C., the chip fly preventive properties were low and thus chip fly was generated as well as the heat-peelability was also low and thus the cut-processed chips could not be easily peeled by heating. Furthermore, in the heat-peelable pressure-sensitive adhesive sheet according to Comparative Example 3, since the gel fraction of the heat-expandable pressure-sensitive adhesive layer was less than 50% by weight, the chip fly preventive properties were low and thus chip fly was generated as well as the heat-peelability was low and thus the cut-processed chips could not be easily peeled by heating.

The heat-peelable pressure-sensitive adhesive sheet of the present invention can be suitably used as a pressure-sensitive adhesive sheet for temporary fixing at the cut-processing of a laminated ceramic sheet. Owing to the heat-peelable pressure-sensitive adhesive sheet of the invention, the laminated ceramic sheet can be easily cut-processed and thus it becomes possible to easily produce electronic parts, laminated ceramic condensers, and the like.

While the present invention has been described in detail and with reference to specific embodiments thereof, it will be apparent to one skilled in the art that various changes and modifications can be made therein without departing from the scope thereof.

This application is based on Japanese patent application No. 2009-050032 filed Mar. 4, 2009, the entire contents thereof being hereby incorporated by reference.

Further, all references cited herein are incorporated in their entireties.

What is claimed is:

1. A heat-peelable pressure-sensitive adhesive sheet for cutting a laminated ceramic sheet, which is used for temporary fixing at cutting of the laminated ceramic sheet,
   the heat-peelable pressure-sensitive adhesive sheet comprising a base material and, formed on at least one surface of the base material, a heat-expandable pressure-sensitive adhesive layer containing a pressure-sensitive adhesive for imparting pressure-sensitive adhesiveness and a heat-expandability imparting foaming agent,
   wherein the heat-expandable pressure-sensitive adhesive layer has a gel fraction of 50% by weight or more, and
   wherein the heat-expandable pressure-sensitive adhesive layer has a glass transition temperature of −40° C. to 30° C.

2. The heat-peelable pressure-sensitive adhesive sheet according to claim 1, wherein a base polymer of the pressure-sensitive adhesive forming the heat-expandable pressure-sensitive adhesive layer is an acrylic polymer.

3. The heat-peelable pressure-sensitive adhesive sheet according to claim 1, wherein the pressure-sensitive adhesive forming the heat-expandable pressure-sensitive adhesive layer further contains a crosslinking agent.

4. The heat-peelable pressure-sensitive adhesive sheet according to claim 1, wherein the heat-expandable pressure-sensitive adhesive layer has an adhesive force at 23° C. at a peeling angle of 180° and a drawing rate at 300 mm/min of 2 N/20 mm width to 20 N/20 mm width when the heat-expandable pressure-sensitive adhesive layer is allowed to stand under an atmosphere of 23° C. for 30 minutes after attached to a polyethylene terephthalate film having a thickness of 25 μm at 23° C., and
   wherein the heat-expandable pressure-sensitive adhesive layer has an adhesive force at 80° C. at a peeling angle of 180° and a drawing rate at 300 mm/min of 1 N/20 mm width to 15 N/20 mm width when the heat-expandable pressure-sensitive adhesive layer is allowed to stand under an atmosphere of 80° C. for 30 minutes after attached to a polyethylene terephthalate film having a thickness of 25 μm at 23° C.

5. The heat-peelable pressure-sensitive adhesive sheet according to claim 1, wherein the foaming agent is a heat-expandable microsphere.

6. The heat-peelable pressure-sensitive adhesive sheet according to claim 5, wherein the heat-expandable microsphere is a microsphere in which a substance easily gasified and expanded is included in a shell having elasticity.

7. The heat-peelable pressure-sensitive adhesive sheet according to claim 1, wherein the foaming agent is an inorganic foaming agent.

8. The heat-peelable pressure-sensitive adhesive sheet according to claim 7, wherein the inorganic foaming agent is an ammonium carbonate, an ammonium hydrogen carbonate, a sodium hydrogen carbonate, an ammonium nitrate, a sodium borohydride, or an azide.

9. The heat-peelable pressure-sensitive adhesive sheet according to claim 1, wherein the foaming agent is an organic foaming agent.

10. The heat-peelable pressure-sensitive adhesive sheet according to claim 9, wherein the organic foaming agent is water, a chlorofluoroalkane-based compound, an azo-based compound, a hydrazine-based compound, a semicarbazide-based compound, a triazole-based compound, or an N-nitroso-based compound.

11. The heat-peelable pressure-sensitive adhesive sheet according to claim 1, wherein the foaming agent is contained in an amount of 1 part by weight to 150 parts by weight based on 100 parts by weight of the base polymer.

12. The heat-peelable pressure-sensitive adhesive sheet according to claim 5, wherein the heat-expandable microsphere has an average particle diameter of 100 µm or less.

13. The heat-peelable pressure-sensitive adhesive sheet according to claim 1, wherein the glass transition temperature of the heat-expandable pressure-sensitive adhesive layer is −30° C. to 25° C.

14. The heat-peelable pressure-sensitive adhesive sheet according to claim 13, wherein the glass transition temperature of the heat-expandable pressure-sensitive adhesive layer is −30° C. to 20° C.

15. The heat-peelable pressure-sensitive adhesive sheet according to claim 14, wherein the glass transition temperature of the heat-expandable pressure-sensitive adhesive layer is −15° C. to 15° C.

* * * * *